Patented Oct. 7, 1941

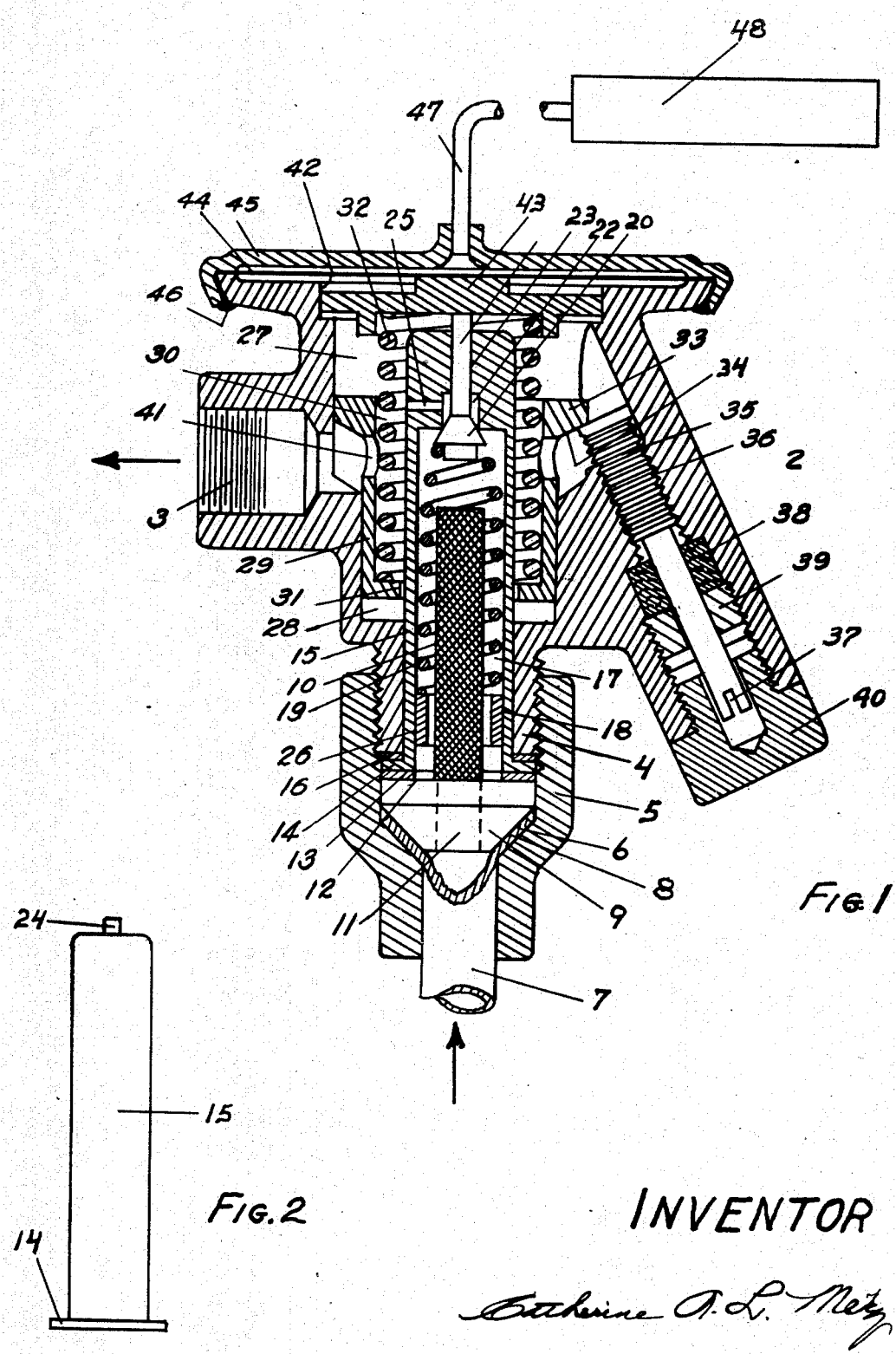

2,258,295

UNITED STATES PATENT OFFICE 2,258,295

EXPANSION VALVE

Catherine A. L. Merz, Chicago, Ill., assignor to Flow Controls, Inc., Chicago, Ill.

Application June 17, 1940, Serial No. 340,938

4 Claims. (Cl. 137—111)

The present invention relates to valves, generally used in refrigerating systems, although it may as well be used for other purposes, and is specifically directed to a valve assembly cartridge, which may be readily removed, as a complete unit, from the valve body proper, and as readily assembled thereto.

In the refrigeration art, it is an accepted fact, that, for widely varying capacities of refrigerating systems, the size of refrigerant flow orifices in such valves should have, in their maximum flow capacities under the normal operating pressure differences, between the high pressure and the low pressure sides of such system and with the particular refrigerant employed, some definite relationship as to maximum flow therethrough relative to the vaporizing capacity of the particular system.

Certain manufacturers employ a multiplicity of valve models, each varying from the other only in respect to the valved orifices, in order to accomplish the desired purpose. Of course this introduces an abnormal expense in stocking these valves, since it is necessary to carry a large stock in order to meet any demand.

A particular method of obviating such large stocking is disclosed in Patent Number 2,195,925, issued April 2, 1940, to Anthony F. Hoesel for Flow restrictor for refrigerant feed valves.

In the usage of valves, it becomes necessary, at times, to replace the entire valve orifice assembly because of eroded seats, and at certain other occasions it becomes necessary to remove such valves from the line in order to blow out accumulated moisture, which clogs the feed therethrough because of ice formation at the seats. It is further desirable to provide valve orifice cartridges, of varying flow capacities, in order to balance the valve feed characteristics to the particular refrigerating system.

An object of the present invention is to provide a valved orifice cartridge which may be readily inserted in or removed from a valve casing.

Another object of the present invention is to provide an improved valve casing, into which various sized valved flow passages may be readily inserted.

A further object of the present invention is to provide a valved removable cartridge in which the erosion of valve seats, and due to passage of fluid therethrough from a high pressure side to a low pressure side, is minimized.

In the drawing:

Figure 1 is a sectional view of a thermostatically controlled expansion valve employing the invention.

Figure 2 is a valve cartridge assembly as used in Figure 1.

Referring to the drawing:

In Figures 1 and 2, a valve casing 2, having an outlet 3, has a threaded boss 4 engaged by a flare nut 5 serving to compress the flare 6, of the copper inlet tube 7, to the seat 8 of the strainer supporting member 9, to which is soldered the strainer 10, and through which is a passage 11 allowing fluid to pass from the tube 7 to the strainer 10.

The strainer supporting member 9 has an upper seat 12 exerting pressure, due to tightening of the flare nut 5, upon a copper gasket 13, which in turn exerts pressure against the lower face of the flange 14 integral with the valve cartridge 15. The upper face, of the flange 14, presses against a copper gasket 16, which in turn is pressed against the face of the threaded boss 4. This system of flare, flare seat, copper gaskets, flange seats, and gasket seats, under the compressive influence of the flare nut 5, provides a leak-proof connection, which can be readily made or unmade for the purpose of inserting or removing the valve cartridge 15.

The copper tube 7 connects to the high pressure side of the refrigeration system, not shown, and the outlet 3 connects to the low pressure side of such refrigeration system.

The valve cartridge 15 has a bore 17 in which a spring support 18 is press-fitted in order to maintain the compression spring 19 at some definite length and consequent definite pressure against the valve 20 seated in the bore 22. The bore 23 provides passage for the valve stem 24 integral with the valve 20.

Leading externally, from the bore 22, is a bore 25, preferably of reduced flow capacity as compared to the flow capacity of the valve 20, when in open position. This then creates a pressure differential, in the bore 22, and consequently the flow, through the valve casing, provides a high pressure at the inlet, a reduced pressure, in the bore 22, minimizing erosion of the valve 20, and a further reduced pressure at the outlet.

The spring support 18 has a bore 26 through which the strainer 10 passes.

The valve casing 2 has bores 27 and 28 in which is closely fitted the diaphragm spring carrier 29 having stepped bores 30 and 31 in which is placed the diaphragm spring 32 and through which the valve cartridge 10 projects respectively. The diaphragm spring carrier 29 has, at its upper end, a flange 33, which has an angular face 34 contacted by the adjusting screw 35, which threadedly engages the valve casing 2, as indicated at 36, and may be screwed up or down by means of inserting a screw driver in the screw driver slot 37.

The packing 38, compressed by means of the packing nut 39, serves to seal the adjusting screw 35 against leaks. After adjustment is made, the sealing cap 40 then further seals against any possible leakage through the packing 38.

A plurality of bores 41, in the diaphragm spring carrier 29, serve as exit, to the outlet 3, of the flow through the valve cartridge 15.

The valve casing 2 has a bore 42 in which loosely plays a pusher plate 43 against the lower side of which the diaphragm spring 32 presses with varying force depending upon the adjustment, of the adjusting screw 35, and consequent increase or decrease in length of the diaphragm spring 32. The lower side, of the pusher plate 43, also contacts the valve stem 24, which moves in accordance therewith under the influence of the diaphragm 44, which contacts the upper side of the pusher plate 43.

The diaphragm 44 and the diaphragm cover 45, both of which are hermetically sealed to the valve casing 2, as indicated at 46, with the capillary tube 47 and the temperature feeler bulb 48, provide a closed system, charged with a proper thermostatic fluid, so that the flow may be regulated in accordance with the temperature of the feeler bulb 48.

From the above it will be seen that I have provided an improved valve mechanism, which can be readily assembled or disassembled for purposes of repair or otherwise. Since the valve cartridges are relatively inexpensive, it will be noted that any such valve may be reconditioned, like new, by means of a new valve cartridge, at very low cost.

Since the valve cartridges can be supplied with varying sizes of outlet bores 25, it will be readily seen that any given valve casing 2 may be applied to refrigerating systems of widely varying capacity and good performance assured merely by inserting the proper sized valve cartridge for the particular system.

In order to ensure interchangeability, of the valve cartridges, I propose machining all valve casings 2 to a definite height, also to machine all pusher plates 43 to a definite thickness. By further making all valve cartridge assemblies of a definite height, I can interchange any valve cartridge in any valve casing with definite assurance that the valve 20 will always have a definite opening for any definite position of the diaphragm 44.

While the drawing shows, and the description describes, a definite embodiment of the invention, it is realized that many variations may be employed without departing from the spirit and scope of the invention, which is to be limited only to the hereto appended claims.

I claim:

1. A valve cartridge assembly for insertion into a valve casing and comprising, in combination, a cartridge having a flow passage, the flow passage comprising, in part, a valve seat, a valve movable to and from said seat, a compression spring in the flow passage and urging said valve to said seat, a spring support to maintain said spring under a definite compressed length, the said spring support being a press fit within the flow passage, at the inlet end, and the pressure of said spring being governed by pressing said spring support, into the flow passage to a predetermined position, the flow exit passage, of said cartridge, having a lesser flow capacity than the maximum potential flow capacity between said valve and said seat, and an exteriorly turned flange at the flow inlet end of said cartridge, to provide a leak-proof joint when compressively engaged with a mating seat of the said valve casing, by means of a flare nut, screwed to said valve casing, and which in turn compressively engages the flared end, of a flared tube refrigerant inlet conduit, against said flange.

2. A valve cartridge assembly for insertion into a valve casing and comprising, in combination, a cartridge having a flow passage, the flow passage comprising, in part, a valve seat, a valve movable to and from said seat, a compression spring in the flow passage and urging said valve to said seat, a spring support to maintain said spring under a definite compressed length, and an exteriorly turned flange at the flow inlet end of said cartridge to provide a leak-proof joint, when compressively engaged with a mating seat of the said valve casing, by means of a flare nut, screwed to said valve casing, and which in turn compressively engages the flared end, of a flared tube refrigerant inlet conduit, against said flange.

3. In a pressure reducing valve casing having an exteriorly threaded fluid inlet boss with a concentric bore and an annular joint seat at the end of said boss, the combination of a valve cartridge assembly having a valved flow passage therethrough and an exteriorly turned flange at its inlet end, the said cartridge being inserted within the concentric bore of said threaded boss and the said flange abutting said annular joint seat, a strainer screen assembly comprising a screen, mounted upon a supporting member, said screen inserted into the inlet end of the flow passage of said valve cartridge and said supporting member abutting said flange, a fluid inlet conduit having a flared end abutting said supporting member and a threaded flare nut engaging said threaded fluid inlet boss and the flared end of the fluid inlet conduit so that screwing up of the flare nut results in all of the abutments being converted into pressure tight joints.

4. In a pressure reducing valve casing having an exteriorly threaded fluid inlet boss with a concentric bore and an annular joint seat at the end of said boss, the combination of a valve cartridge assembly having a valved flow passage therethrough and an exteriorly turned flange at its inlet end, the said cartridge being inserted within the concentric bore of said threaded boss and the said flange abutting said annular joint seat, a strainer screen assembly comprising a screen, mounted upon a supporting member, said screen inserted into the inlet end of the flow passage of said valve cartridge and said supporting member abutting said flange, gaskets between all of the aforesaid abutments, a fluid inlet conduit having a flared end abutting said supporting member and a threaded flare nut engaging said threaded fluid inlet boss and the flared end of the fluid inlet conduit so that screwing up of the flare nut results in all of the abutments being converted into pressure tight joints.

CATHERINE A. L. MERZ.